Oct. 6, 1970 — H. ZIRNGIBL ET AL — 3,532,462

METHOD OF EFFECTING GAS-PHASE REACTIONS

Original Filed April 21, 1964 — 5 Sheets-Sheet 1

INVENTORS:
HANS ZIRNGIBL, WALTER GUTSCHE, WALTER WEIDMANN,
KLAUS WAUSCHKUHN.
BY
ATTORNEYS

INVENTORS:
HANS ZIRNGIBL, WALTER GUTSCHE, WALTER WEIDMANN,
KLAUS WAUSCHKUHN.

BY

ATTORNEYS

United States Patent Office 3,532,462
Patented Oct. 6, 1970

3,532,462
METHOD OF EFFECTING GAS-PHASE REACTIONS
Hans Zirngibl, Duisburg, Walter Gutsche, Krefeld-Bockum, Walter Weidmann, Duisburg-Muendelheim, and Klaus Wauschkuhn, Krefeld-Bockum, Germany, assignors to Farbenfabriken Bayer Aktiengesellschaft, Leverkusen, Germany, a corporation of Germany
Continuation of application Ser. No. 361,357, Apr. 21, 1964. This application Oct. 31, 1967, Ser. No. 682,720
Claims priority, application Germany, Apr. 27, 1963, F 39,605
Int. Cl. C01g 23/04
U.S. Cl. 23—202
3 Claims

ABSTRACT OF THE DISCLOSURE

Continuous gas phase endothermic or weakly exothermic reactions yielding a reaction product which is solid at least under normal conditions, e.g. decomposition and oxidation with oxygen-containing gas of the corresponding halides to form titanium dioxide, silicon dioxide, aluminum trioxide, ferric oxide, and mixtures of titanium dioxide with silicon dioxide or aluminum trioxide, in which the components in gaseous form, preheated, e.g. to 500–800° C., and optionally together with added easily ionizable gases, are reacted in a primary reaction zone under conditions of maximum turbulence whirling motion mixing contact with each other, e.g. by feeding one reactant tangentially and the other axially into a conically diverging vortex path, with one or both reactants being heated before or during the mixing contact to a higher temperature, e.g. to 800–2000° C., by electrical energy, e.g. under a high voltage such as 1–10 kv., while inert solid particles are maintained under high velocity substantially circular motion in scouring contact with the confining wall of the reaction zone to prevent deposition of the solid reaction product, and the solid reaction product separated from the gaseous reaction mixture after passing through a secondary reaction zone.

---

This is a streamlined continuation application of copending parent application Ser. No. 361,357, filed Apr. 21, 1964, now abandoned.

The invention relates to a universally applicable, practically disturbance-free method for carrying out continuously in the gas phase endothermic or weakly exothermic reactions yielding as the reaction product a substance which is solid at least under normal conditions. More particularly the invention relates to a process for the preparation of finely divided inorganic solids, such as oxides, nitrides, carbides, borides, sulphides, silicides and halides by reacting gaseous materials at elevated temperatures, preferably to the thermal decomposition of the halogen compounds of titanium, silicon, or aluminum, especially of titanium-tetrachloride, with oxygen-containing gases. The reactions according to the invention require the continuous input of at least the activation energies.

Additional heat can be supplied to these reactions in various ways. Conventional methods include the indirect heating of the reaction space, the use of electric heating elements in the reaction space, the simultaneous execution of strongly exothermic reactions in the reaction zone or the supply of the required energy by means of the hot reaction gases of a separate exothermic chemical reaction. It has also been known for some time that chemical reactions can be promoted by means of a gaseous discharge in the reaction chamber.

When, about 60 years ago, the manufacture of nitric acid from atmospheric nitrogen started to become important, numerous processes working according to this principle were developed and carried out on an industrial scale, for example, the processes according to Birkeland-Eyde and Schonherr, the Nitrum- and Pauling processes, to mention only a few.

All these processes have drawbacks, which restrict their applications either to a single or to only a small number of reactions.

Indirect heating can be employed only when the reactions can be carried out in metallic reactors with good heat transfer, that is to say, temperatures of 800° C. must not be exceeded. These applications are further restricted by corrosion problems.

The execution of reactions using electrical heating elements likewise presuppose a substantial chemical inertness of the heating elements with respect to the reaction components. The initiation and the acceleration of reactions, by means of auxiliary chemical reactions, is a frequently-used practice which has, however, the drawback that it leads to contamination of the reaction products.

The execution of chemical reactions in electrical discharge in gases has been similarly restricted to a few instances. Reactions yielding large amounts of solid products are difficult to control owing to fouling of the electrodes. A further drawback is the unequal temperature-distribution in gas discharges, which usually leads to incomplete conversions and, in the preparation of finely-divided solids, to non-uniform products.

Processes have recently become known, which employ a low-impedance or a high-tension electric arc to heat one of the reaction components or an inert auxiliary gas. The preheated gas is then contacted with the other reaction components in a mixing chamber. In these processes, the electrodes have only a short service life because of the high electrical and thermal stresses. They have either to be very intensively cooled, so that a portion of the electrical energy is wasted, or the electrodes must continuously be adjusted depending on their consumption.

The solids produced in the gaseous phase involve a series of difficulties. Therefore the reactions according to the invention must not be applied to processes producing only gaseous or liquid reaction products. Apart from heat transfer and mixing problems as well as the task to produce products with chemical and physical properties, which are as uniform as possible, the solids obtained have the disadvantage that they adhere to the walls of the reaction zone as well as to the feed pipes, nozzles and the other equipment required. Therefore a number of attempts have been made to obviate these disadvantages.

According to Swiss Pat. 265,192 metallic chlorides are decomposed with oxygen-containing gases at high temperatures with the supply of the thermal energy by means of an auxiliary flame or by electrical discharges or electrically heated elements. The oxygen component is admitted into the reaction zone at a whirling motion whereby the reaction with the metallic chloride vapour in the decomposition zone occurs at a certain distance from the inlet orifices of the reactants in order to prevent them from becoming clogged. In this process however the mixing of the reactants is not advantageous. Besides, owing to its arrangement and the processing conditions, the electrodes rapidly become coated with the solid reaction products during the supply of thermal energy in the reaction space and the electrodes become too hot so that they cannot withstand the high stresses imposed on them. It has further been proposed to mix the reactants in a fluidized bed of inert material and to react them therein. According to this proposal the material for the fluidized bed or the reactants as such are heated up by an auxiliary flame (see e.g. United States Letters Patents 3,105,742 and 3,043,657).

In the aforedescribed process the resulting product however grows on the material used for the fluidized bed. Therefore, this material must be replaced continuously or even in charges. Besides, larger or smaller losses of the desired end product occur.

As a modification of these fluidized bed processes it has further been proposed—Belgian Pat. 624,372 and British Pat. 925,876—to introduce inert materials e.g. sands or portions of the end product itself, into the reaction chamber together with the gases to be reacted, or separately against the inlet orifices of the gases. This method serves to keep the gas inlet orifices free of the solids formed.

The inert solids however are blown into the reaction chamber in large amounts at high axial velocity, with the aid of considerable quantities of an inert propellant which complicates inter alia the separation of the reaction product from the inert material, apart from the fact that the considerable amounts of the inert material have to be recycled through separating and purifying stages and through heat exchangers. A further draw-back of this process is the loss of heat of the reaction gases by the considerable quantities of the inert material admitted. This requires an excessive energy expenditure.

United States Letters Patent 2,957,753 describes a process wherein a mixture of titanium-tetrachloride and oxygen is reacted to yield $TiO_2$ in a laminar or turbulent flow in a reactor divided into 3 to 4 zones for preheating, seed formation, combustion and cooling. The thermal energy is supplied by the combustion of CO, whereby flame formation occurs only after partial reaction of the reactants, i.e. the seed formation. The walls of the reactor are porous and are rinsed with CO and, at the lower part, with $TiCl_4$ to prevent depositions of $TiO_2$. The equipment required for carrying out this process requires a high expenditure and therefore is liable to disturbances. Like any other processes to be performed with an auxiliary flame the aforesaid process suffers from the drawback that, in addition to the solid product, there are guaranteed large quantities of gases from which the solid product has to be separated and which have to be worked up and concentrated respectively in order to recover the chlorine formed.

The draw-backs associated with the prior art processes are obviated according to the invention which provides a new method of carrying out endothermic or weakly exothermic gas phase reactions at temperatures of 800–2000° C., yielding a reaction product which is solid at least under normal conditions, wherein the reactants which have been preheated to temperatures of 500–800° C. are heated up to temperatures of 800 to 2000° C. by the conversion of electrical energy into heat energy, and are reacted in the presence of inert material and wherein the reaction is performed in a zone of maximum turbulence, while in the reaction chamber such inert material is kept at high velocity in substantially circular motion and the reaction products are recovered from the gaseous products after a passage through one or more secondary reaction zones.

According to an embodiment the invention provides a 4-stage process, wherein (a) the reaction components are preheated by conventional methods to temperatures from 500 to 800° C.;

(b) at least one of the reaction components is introduced at high velocity into a cylindrical tube or into cylindrical tubes in such a manner that a whirling motion is produced and this reaction component is brought to the required temperature by high-tension electrical heating, preferably with an input of 2 to 10 kv. and the conductivity of the gaseous or vapour-phase-reaction component, which increases with temperature, is further promoted by the addition of easily ionisable gases;

(c) the heated reaction components are in turn introduced with a whirling motion as in (b) possibly together with centrally introduced not preheated reaction components into a conically-flared vertical combustion chamber at such velocities that a back flow occurs in the core of the combustion chamber, which effects instantaneous and intensive mixing while wear-resistant, chemically inert and approximately spherical bodies are held in circular motion along the wall of the combustion chamber, and (d) the reaction material is conveyed through a secondary reaction chamber to a cooling chamber wherein the product is intensively mixed with cold gases or liquids.

In the first stage, the reaction components are, if necessary, evaporated and indirectly preheated to 500 to 800° C. in superheaters of conventional type operating with economic fuels. The material to be employed depends upon the medium to be heated. The heating could of course also be effected electrically. In the second stage, the reaction gases are introduced separately into a corresponding number of discharge chambers, which are substantially identical with those used in known discharge processes. The preheated gas is blown at high velocities with vortex motion into a cylindrical tube, preferably made of a conductive material, into which a rod-shaped central electrode which is insulated against the burner tube projects axially from the direction of the inlet. The burner tube, which serves as the second electrode, is preferably earthed. It is also possible to construct the tube of the discharge chamber from non-conductive material, for example from fireproof ceramics. In this instance, the counter-electrode is a separate second electrode, likewise located in the tube axis at a distance from the first electrode. A voltage of 1000 to 10,000 v. preferably A.C., is applied to the electrodes. To increase the conductivity of the gas to be heated, an easily ionisable vapour or gas is introduced through a bore of the central electrode. Especially suitable for this are the alkali metal or alkaline earth metal compounds, for example halides of K, Rb, Cs or Ba and/or easily ionisable gases such as hydrocarbons or nitrogen oxides.

The vortex motion of the gas in the discharge tube results in the zone of highest temperature being concentrated along the tube axis, while a layer of relatively cold gas cools the inner wall of the tube to such an extent that its temperature is only slightly greater than that of the preheated the tube.

The nature of the materials employed in the construction of the electrodes again depends upon the properties of the gas to be heated. With oxygen-containing gases there are primarily employed such compounds as nitrated silicon carbide, molybdenum silicide, zirconium silicide and cermets based on, for example, $Cr-Al_2O$ or $Ni-ThO_2$. Metals such as steel, nickel or scale-proof alloys, which can be cooled by means of suitable cooling media such as high-temperature resistant oils or salt melts can optionally be employed in the construction of the electrodes, especially of the central electrode exposed to greater loads. In order to obviate heat losses, the cooling medium may be kept at the temperature of the gas entering the system. By suitably shaping the central electrode, for example forming it as a hollow electrode, the current density on the central electrode can be kept so low that cooling can be dispensed with provided a resistant material having a high melting point is used. As an additional protection for the central electrode, it was found advantageous to surround it with an inert gas, which can be discharged, at the discharge end of rod-shaped electrodes, or, through the hollow space of hollow electrodes. Here, owing to the vortex motion around them, the rod electrodes will be surrounded by a film of protective gas. Advantageously the ion-producing gas is simultaneously employed as the protective gas, for example, a hydrocarbon gas can be used when heating up oxygen-containing gases. Other known means can be applied for further protection of these electrodes, for example mechanical rotation of the electrode or a circular motion produced by a rotating magnetic field. With other, i.e. non-oxidising gases, graphite or carbon are suitable for use as construction materials.

The ignition of the discharge is normally effected by simply applying the no-load voltage of the high-tension transformer to the electrodes. If this voltage is insufficient, due to an excessive distance between the electrodes or by reason of an insufficiently conductive gas, the electrodes have to be briefly short-circuited or, more advantageously, the discharge is initiated by superimposing an auxiliary current of, for example, 2000 v. on the operating voltage.

The following phenomena can be observed in the discharge tube after ignition: In the centre of the tube starting from the brightly glowing central electrode and extending to its end, there is a blue-white glowing column of hot gas, surrounded by a darker zone of colder gas which extends to the tube wall. Sparks jump continuously from the hot column in the interior to the tube electrode, which appear to follow a spiral trajectory in the direction of the flow. The discharge zone extends to the end of the tube even for a ratio tube diameter: length of 1:25 and corresponding flow velocity. The dimensions of the tube and the amount of current supplied depend upon the quantity and final temperature of the gas to be heated, where expediently an axial flow velocity of 2 to 150 m./sec., calculated on the cold gas, has to be maintained. With suitable dimensions and gas feed, burners can be operated at several hundreds kilowatts.

Figure 3:
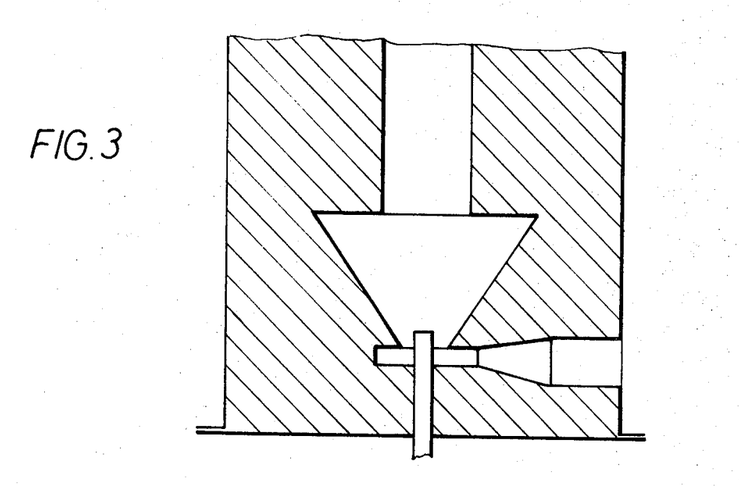
Figure 4:
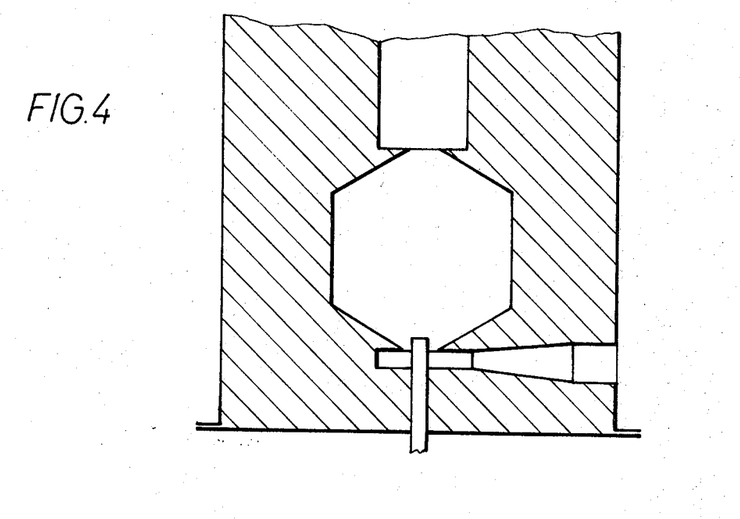

The gases, preheated to the desired temperature, are blown, in stage 3 of the process, partly in vortex motion, partly centrally, into an upwardly flared funnel-shaped combustion chamber at such velocities that a partial vacuum of up to 1000 mm. water column and more in relation to atmospheric pressure is formed in the centre of the chamber. This is achieved by introduction of the gases with vortex motion and at a gas flow velocity of at least 12 m./sec. The shape of the combustion chamber may vary. It may consist, as in FIG. 1, of a simple hollow cone whose upper diameter corresponds to that of the secondary reaction space; a cone with a somewhat greater upper diameter, as shown in FIG. 3, is also advantageous. Combustion chambers having two conical portions, with openings facing one another and connected by a short cylindrical piece, can also be employed with good results (FIG. 4). Essential is the conical flaring of one part of the chamber, which brings about the back vortex flow and the rapid mixing of the components. The inlet apertures and combustion chamber must be constructed of a highly refractory material, chemically inert with respect to the reaction components. Highly suitable for this are, for example, sintered corundum, sintered magnesia, $ZrO_2$, $ThO_2$, SiC and BeO. The central admission of one of the reaction components is advantageously effected through a tube made of a ceramic material which projects into the cone. Owing to the strong back flow of the gases due to the considerable lowering of pressure in the centre of the chamber, an extremely intensive mixing of the reaction components takes place instantaneously. This produces a uniform temperature throughout the chamber and ensures that the reaction will proceed practically homogeneously. The advantage of this mixing manifests itself above all in the uniform quality and highly uniform particle sizes of the finely-divided solids which are obtained. This is especially desirable in the preparation of pigments and fillers.

Many solids tend to settle on the walls of the reactor vessel at the instant of their formation, where they may form hard crusts which constantly increase in thickness during the reaction. This uncontrollably alters the flow conditions in the reactors and, in continuous operation, there is a danger of complete blocking of the tubes. This frequently observed disadvantage was overcome by introducing into the reaction chamber, before reaction begins, small amounts of inert, substantially spherical bodies which neither melt nor lose their hardness at the high reaction temperatures. On blowing in the gases, these bodies are propelled along the wall of the combustion chamber with high velocities, in spiral, substantially planar trajectories; they thus prevent incrustation by the solid reaction products by purely mechanical action. The quality of the solid bodies must be such that they do not interfere with or slow down the flow in the chamber.

The diameter of the individual bodies must be at least so great that they cannot be expelled from the reaction tube connected to the combustion chamber. Accordingly, their diameter depends on their density and on the flow velocity, but is always from 0.5 to 10 mm. Especially suitable materials for these bodies are compact-sintered masses, or masses prepared by melting, of $Al_2O_3$, $SiO_2$, $TiO_2$, $ZrO_2$, $MnO_2$, BeO, $ZrSiO_4$, MgO, SiC, $Si_3N_4$, TiC, $TiB_2$, $ZrB_2$, $MoSi_2$ or corresponding mixed oxides.

A tube, whose diameter/length ratio depends upon the desired residence time, preferably circular in cross-section, and consisting of a highly fireproof, inert material is connected to the combustion chamber.

This tube is maintained at the temperature of the combustion chamber uniformly over its entire length by good thermal insulation. This secondary reaction chamber communicates with a cooling chamber, the shape of which is similar to that of the combustion chamber. The wide opening of the cone, however, faces downwards. A quantity of cold gas, depending upon the desired mixing temperature, is blown tangentially into the chamber to quench the reaction products. Advantageously, returned waste gas which has been cooled in the conventional manner over a heat exchanger is employed for this. In some instances, it is more advantageous to inject, tangentially through a spray nozzle, a liquid whose heat of evaporation effects the quenching. Suitable for this purpose are water, organic liquids or liquefied inert gases such as $CO_2$ or, preferably, one of the waste gas components which has been liquefied, e.g. $Cl_2$, $SO_2$, $H_2S$ or $NH_3$.

Figures 1, 2:
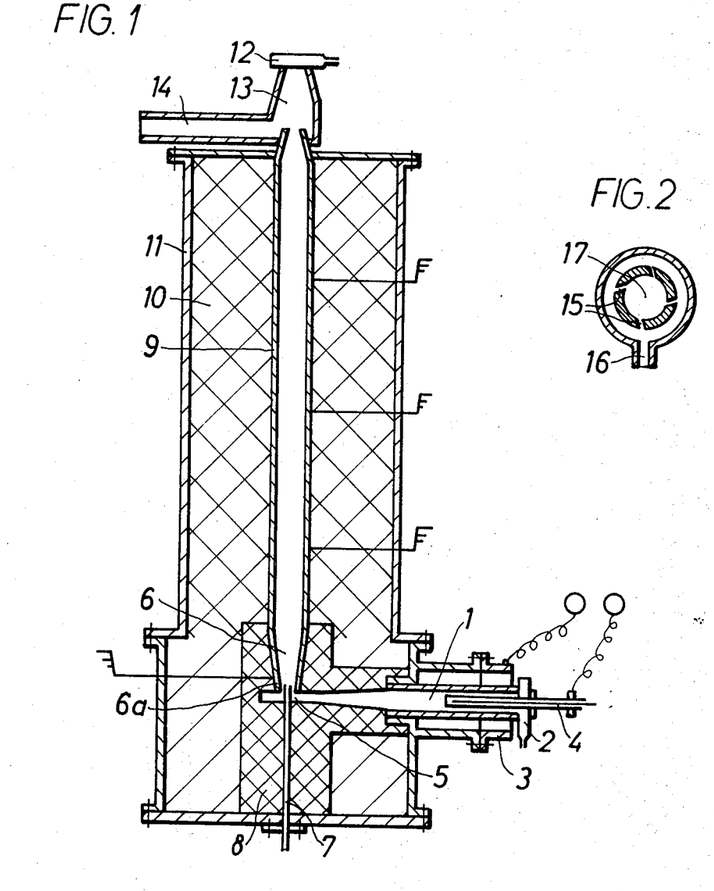

The separation of the reaction products is carried out in the conventional manner. The finely-divided solids which are suspended in the waste gas are removed from the gas mixture by means of cyclone separators, bag filters or Cottrell-filters, and the gas mixture is separated into its constituents by absorption, cooling or chemical reactions. FIG. 1 shows one possible embodiment of the apparatus employed for use when there are two reaction components.

Referring to FIG. 1 of the drawing an electric high tension burner 1 is provided with gas inlet chamber 2, discharge tube 3 and central electrode 4. The gaseous reaction component, heated in the burner 1, passes through the inlet chamber 5 into the conical combustion chamber 6 where it reacts with the second component fed in through the conduit 7; 5, 6 and 7 are hollow spaces to block 8 which consists of a high-temperature resisting material. Space 6 can additionally be provided with a wear-resistant wall liner or insert 6a. The secondary reaction tube 9 communicates with the cooling chamber 13, into which the cold gas in introduced through the inlet chamber 12. The reaction products leave the apparatus at 14. The whole of the apparatus is surrounded by a sheet metal jacket 11, which is filled with a thermally insulating material 10.

FIG. 2 corresponds schematically to both a horizontal section through the inlet chamber 12 and a vertical section through 5 and 2. The inlet chamber imparts a vortex motion to the gas entering at 16 by means of the tangential slots 15 in the inner space 17.

The instant process can preferably be applied in the production of inorganic oxidic pigments and fillers of the desired properties, e.g. uniform particle size, large specific surface area, in particular surface properties as well as uniformly chemical and physical structure. The halides of titanium, silicon and aluminum are in particular suitable to be reacted with air or oxygen to yield the corresponding oxides. Besides, catalysts, semiconductors, dielectrics, borides, nitrides, carbides, sulphides, silicides and the like can also be prepared from the corresponding volatile or reactive compounds. The preparation of $TiO_2$ is performed at temperatures of 700 to 1900° C., preferably 800 to 1200° C., $SiO_2$ is obtained at temperatures of 600 to 1500° C., preferably 800 to 1200° C.

Figure 7:
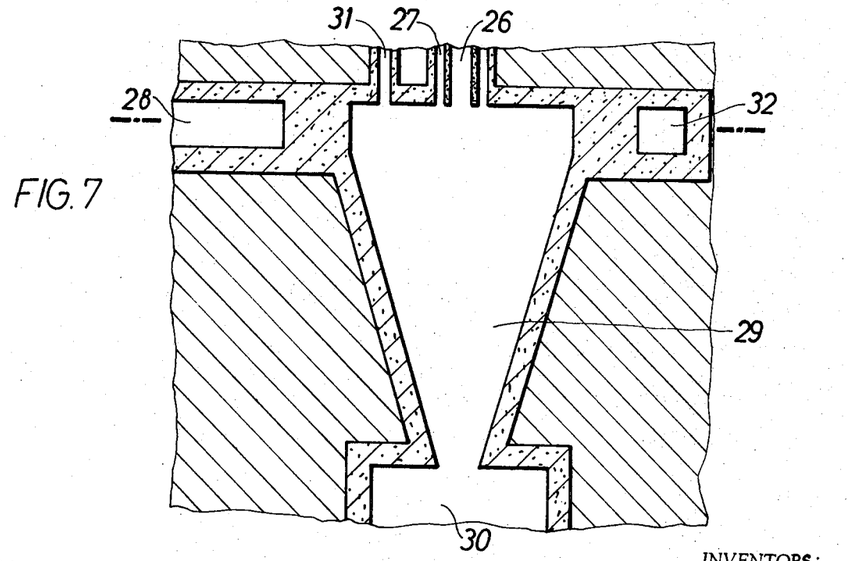

According to a second embodiment of the inventive process the reaction is carried out in a conically narrowing reactor by introducing the reaction components and the reaction products respectively into the reactor at the top thereof. FIG. 7 shows a reactor which is suitable for carrying out this embodiment of the invention.

Figure 6:
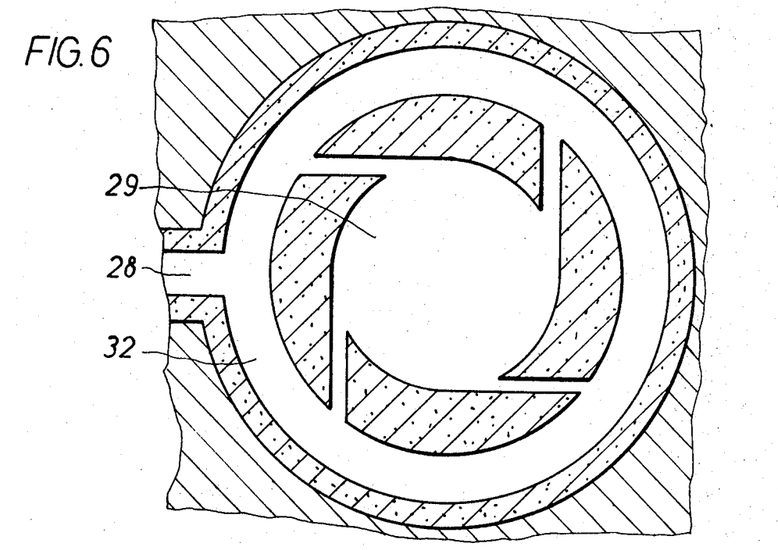

The apparatus of FIG. 7 consists of a conical chamber 29 constructed of inert, highly fire-proof abrasion-resisting material, whose wide aperture communicates with a spiral scoop compartment 28 shown in top view in FIG. 6, into which one of the gaseous reaction components is introduced. The inlet conduits 26, 27 and 31 serve for the admission of further reaction components, which may be solid or gaseous, and for the introduction of inert friction bodies. The conical reaction chamber also communicates with the secondary reaction chamber 30, which is a tube constructed of a highly fireproof inert material, which is preferably circular in cross-section and whose cross-section/length ratio depends upon the desired residence time. The other elements of the reactor resemble the reactor shown in FIG. 1. The same applies to the materials used.

The functioning of this embodiment of the new apparatus will be illustrated in the following example which describes the preparation of $TiO_2$ from $TiCl_4$ and air or oxygen-enriched gases.

Before they are introduced into the reaction chamber, the reaction components are heated by conventional means, such as superheaters, to temperatures from 250 to 800° C. and are then brought to temperatures from 800 to 2000° C. at least partly by electrical discharges, preferably by means of a blown electric arc. One of the reaction components, preferably the one with greater volume, is then tangentially introduced into the combustion-mixing chamber, while the other is introduced centrally or extra-centrally. The tangential introduction of one of the reaction components creates a strong vortex motion, which results in considerable pressure differences, about 300 mm. water column, between the pressure in the centre of the chamber and that at the walls thus effecting thorough mixing of the reaction components. Because of the strong vortex motion, the reaction substantially takes place in the centre of the chamber, where by reason of the high entrance velocities of the gases, 5 m./sec. to 50 m./sec., the residence time of the reaction mixture in the chamber is very short, so that the reaction partly takes place in the secondary reaction chamber. During the reaction, abrasion-resistant, chemically inert friction bodies are blown continuously or discontinuously into the chamber through the central or extra-central opening. Air, inert gas or returned reaction gas is employed as propellant. Owing to the vortex formation, the friction bodies are projected against the wall of the chamber, where they are kept in circular motion. Because of the conical shape of the chamber, surprisingly few of the friction bodies are driven out by the downward-flowing product stream. These friction bodies keep the inner wall of the reaction chamber free from incrustation by the reaction products. Since losses in friction bodies by entrainment are relatively low, they can be introduced into the reaction chamber only slightly heated or even cold.

In a further modification of the above described embodiment of the above process the thermal decomposition is carried out in stages. This process is described in the following with reference to the thermal decomposition of $TiCl_4$ to form $TiO_2$.

Figure 5:
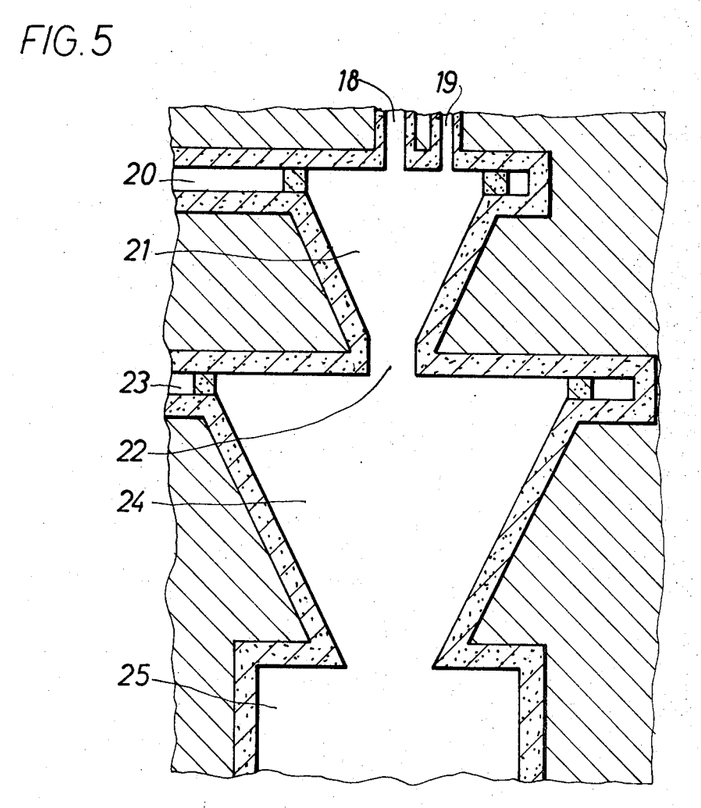

FIG. 5 shows an embodiment of the apparatus according to the invention in which the thermal decomposition is carried out in 2 stages:

The apparatus of FIG. 5 comprises two conical combustion-mixing chambers 21 and 24, constructed of a highly refractory, inert and abrasion-resistant material. On each of the wide ends of these chambers 21 and 24 there is seated a spiral scoop compartment 20 and 23 (see FIG. 6). The full amount of a gaseous reactant is blown in through the spiral scoop compartment 20 tangentially at 21, while 20% of the second reaction component is passed in, either centrally through 18 or extra-centrally through 19. The conduit left free in either instance can then be employed to introduce the friction bodies or a third component. The partly reacted mixture is introduced into the chamber 24 centrally at 22 and there reacted with the remainder of the component of larger volume admitted thorugh 23. If desired, the secondary reaction chamber 25 can be connected to 24. The cooling and separation of the reaction product is effected in the manner described above.

In the first chamber, subcrystalline particles—nuclei—are produced by partial reaction, which grow in the second chamber, in the course of the principal reaction, to the desired, highly uniform sizes. The preliminary reaction is carried out in such a manner that the whole of one of the reaction component, e.g. the $TiCl_4$, is mixed with 3 to 20% of the oxygen required for complete combustion in the first chamber at a temperature which is 200 to 300° C. below the temperature required for complete reaction, i.e. 1000° C. Then, in the second chamber, the partly reacted mixture which contains seed crystals, is reacted with the remainder of the necessary oxygen. The process can be applied correspondingly to other metal oxides, such as $SiO_2$, $Al_2O_3$ or $Fe_2O_3$. It may be advantageous to add during the reaction or immediately thereafter vapour phase or gaseous compounds which will decompose together with the oxide-forming reaction components. In this manner, mixed oxides or mixed phases can be formed, for stabilising or for modifying the oxides, pigments, catalysts or fillers. The oxide particles can, moreover, also be coated with a film of another metallic or non-metallic oxide. Thus, in the preparation of $TiO_2$ for example, $TiCl_4$ may be blown in mixed with small amounts of $AlCl_3$ and/or $SiCl_4$.

The principle of seed formation in the preparation of $TiO_2$ is in itself known. For example, in the process of Belgian patent specification 618,070, the seed formation is effected by hydrolysis, which, however, leads also to the formation of HCl. The formation of HCl is undesirable because of its corrosive effects, especially during subsequent separation of the reaction products. In addition, the presence of HCl may easily lead to contamination of the $TiO_2$ formed.

By contrast, the particle size can be very simply regulated in the present apparatus by controlling the reaction gas feed. This not only leads to a product with a very uniform particle size distribution, but also makes it possible, within certain limits, to adjust the particle size dimensions.

Finally the process according to the invention can be carried out in such a manner that the reactants if desired after being preheated in the reaction zone, are heated up to temperatures of 800° to 2000° C. during the mixing in the form of vortex. Mixing is also effected in a conically narrowing combustion-mixing chamber whereby at least one of the preheated components is tangentially introduced at the wide end of the chamber. The reactants are heated to temperatures of 800 to 2000° C. by means of a blown electric arc at a voltage of 1 to 10 kilowatt. Analogously to the above described embodiments of the invention, inert, preferably cold friction bodies are introduced into the reaction chamber simultaneously with the reaction components, continuously or discontinuously, lateral and/or centrally.

The process is carried out in the following manner: firstly, one or several of the reaction components are separately preheated in conventional heat exchangers to temperatures which can be supported by conventional materials (250° to 800° C.). They are then introduced into the combustion chamber in such a manner that a strong vortex is created. This is normally effected by introducing the component with the greater volume tangentially and the other centrally, when two components are involved. It is, however, also possible to introduce both components tangentially and to feed in only the friction bodies centrally. Similar considerations apply, of course, where more than two components are involved.

In some reactions it can also be of advantage to premix the reaction components before they are introduced into the reaction chamber and to preheat them only to such an extent that a reaction does not take place. For example, temperatures of the order of 500° C. must not be exceeded in the preparation of $TiO_2$. The components are then brought to the temperature required to effect reaction only by the electrical discharge in he reaction chamber.

When the reaction components are fed in tangentially the introduction of the friction bodies is advantageously effected extra-centrally, while, where one of the components is introduced centrally, the friction bodies are also fed in centrally.

In the preferred embodiment of the modified process of the present invention the oxygen-containing component of the reaction mixtures is preheated to a temperaure lower than the reaction temperature and introduced tangentially into the reaction chamber, serving simultaneously as the propellant gas for the friction bodies. This practice has the advantage that the walls of the reaction chamber are held at a temperature lower than the temperature of the reaction zone proper so that the solid reaction products are formed almost entirely in the centre of the chamber, so that there are only very slight incrustations on the chamber wall, and these can easily be removed by the friction bodies. The cooling of the reactive chamber walls, is also achieved when the reaction components are premixed and tangentially introduced at low temperatures into the reaction chamber.

The oxygen-containing component may further be mixed with inert gas or recycled reaction gas.

The volume of the discharge chamber should be as small as possible, in order to achieve high flow velocity and considerable turbulence for a given throughput. The mixing rate of the reaction components wlll thus be increased and the friction effect of the inert bodies reinforced. Furthermore, the reaction will then take place only partially between the electrodes and complete conversion will occur in the cylindrical secondary reaction chamber, which communicates with the combustion and mixing chamber proper.

Figure 8:
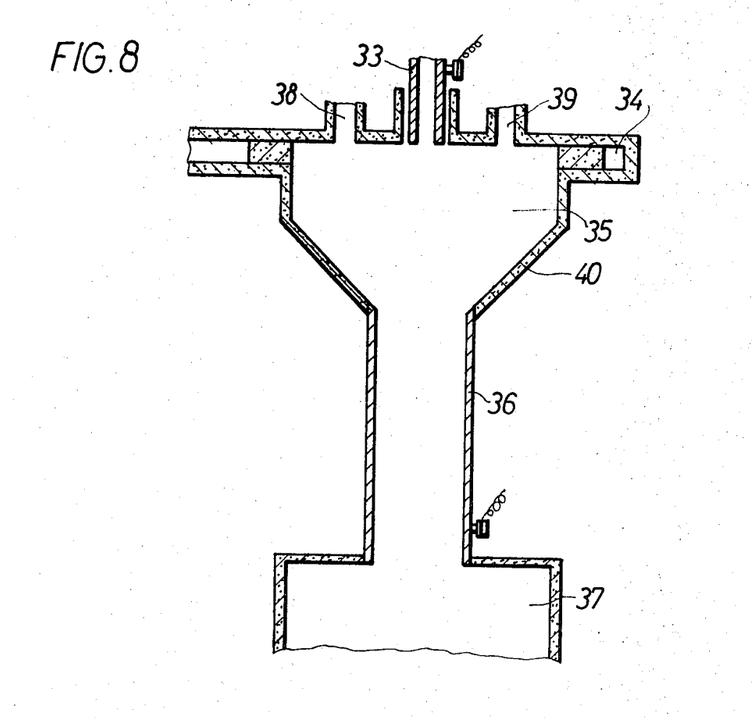

FIG. 8 illustrates a preferred apparatus for carrying out the above-described process, which is given here by way of an example only and is not in any way intended to limit the application of the present invention.

Referring to FIG. 8 of the drawing one of the preheated reaction components optionally together with the friction bodies, is introduced through the bore of the central electrode 33. The second and, where applicable, further gaseous reaction components are blown tangentially (see FIG. 6) into the discharge chamber 35 through the spiral scoop compartment 34. An alternating current, derived from a high-voltage transformer, is applied between the electrode 33 and the counter-electrode 36, thus initiating the discharge. The A.C. voltage can, of course, be rectified previously. The reaction components, heated and mixed in the discharge, then enter the secondary reaction chamber 37. Additional friction bodies can be introduced into the discharge space 35 through the feed conduit 38. They are then seized by the vortex and spiral downwards along the inner wall of the cone 40. To increase the conductivity, easily ionisable substances can be added to one or several of the reaction components. Instead of being fed in through the central electrode one of the reaction components can instead be introduced through the feed conduit 39. This is particularly advantageous when the electrode 33 has to be advanced. On the other hand, as already stated, it is also possible to introduce two reaction components tangentially either separately or in admixture. For separate tangential introduction, the spiral scoop compartment can, for example, be compartmented, so that the two components enter through the slots in an alternating sequence. The distance between the two electrodes depends primarily upon the desired output of the arc. It was found to be advantageous to operate the electric arc with high-voltage, low-intensity currents, since for a given output this reduces the electrode burnoff and allows the use of feed cables and transformer coils of smaller cross-section.

The other reaction conditions are also applicable to this modification of the new process.

EXAMPLE 1

Preparation of titanium dioxide in rutile form:

17.3 kg. of $TiCl_4$ were evaporated hourly, superheated to 300° C. and were brought to reaction with 11.4 Nm.³/h. of air in a reaction chamber according to FIG. 1, which had an an upper diameter of 100 mm. and contained 150 g. of corundum spheres of about 1.5 mm. diameter. The air was preheated from 600 to 1100° C. in the high-tension burner and introduced tangentially into the combustion chamber. The reaction temperature then established was 1240° C. After a residence time in the hot zone of 0.5 sec. the reaction products were quenched to 400° C. in the mixing chamber by blowing in cold, returned waste gas and were thereafter separated in a cyclone separator and a dust filter. After one hour there were collected 7.1 kg. of titanium dioxide, corresponding to a yield of 97.5%. The pigment had a high covering power and excellent dispersibility. 85 weight percent of the product had a particle diameter between 0.2 and 0.3 micron. The waste gas contained 29.5% of $Cl_2$, 67% of $N_2$ and 2.8% of $O_2$, together with traces of HCl and steam.

EXAMPLE 2

Hydrolysis of $SiCl_4$ with steam:

25.5 kg. of $SiCl_4$ were evaporated within an hour, heated at 300° C. and were introduced centrally into the combustion chamber, into which there were blown in vortex flow 5.6 kg. of stem, previously superheated to 1000° C. in the high-tension burner. The reaction temperature was 1060° C. The quenching and the subsequent separation of the solid and gaseous reaction products was carried out in the manner described in Example 1. There were obtained 8.8 kg. of very finely-divided $SiO_2$, the particle diameter of which was predominantly (about 75%) below 0.05 microns. The yield, calculated on the $SiCl_4$ charged, was accordingly 98%. The effluent gas consisted of 97.0% HCl, the remainder being steam.

EXAMPLE 3

Reduction of $TiCl_4$ to $TiCl_3$ with hydrogen:

19 kg. of $TiCl_4$ were evaporated within an hour and heated to 1200° C. in the high-tension burner. Within the same period, 1 Nm.³ hydrogen was likewise heated to 1200° C. in a second high-tension burner. The reduction took place in a conical combustion chamber at 800° C., the $TiCl_4$ being introduced in vortex flow, $H_2$ introduced centrally. The reaction products were quenched to 200° C. after a residence time of 1–2 sec. and subsequently separated.

There were obtained a total of 13.1 kg. $TiCl_3$ in the form of violet flakes, corresponding to a yield of 85%, calculated on the $TiCl_4$. Effluent gas: 83.5% HCl, 14.5 $TiCl_4$, 2% $H_2$.

EXAMPLE 4

Preparation of TiO$_2$ by reacting TiCl$_4$ with O$_2$.

7.6 Nm.$^3$ of oxygen, preheated to 400° C. in a superheater of conventional type, were blown in hourly through the spiral scoop compartment of an apparatus according to FIG. 7. At the same time, 43 kg. of TiCl$_4$, superheated to 800° C., were introduced, together with 1 weight percent of AlCl$_3$, through the annular conduit 32. Incrustations in the combustion chamber 29 were effectively prevented by blowing corundum sand, with a grain size from 0.2 and 0.5 mm., through 31 and 26 from time to time.

A reaction temperature of 1090° C. was established in the combustion chamber 29 and in the residence tube 30. The TiO$_2$ recovered in the subsequent parts of the apparatus consisted practically entirely of rutile. Its particle size was 80% between 0.2 and 0.3 micron. It has an excellent clearing- and covering, i.e. hiding power.

EXAMPLE 5

Preparation of TiO$_2$ from TiCl$_4$ and air.

4.2 Nm.$^3$ of air at 1200° C. were introduced at 18 into the apparatus according to FIG. 5, while 33 kg. of gaseous TiCl$_4$/hour were fed in at 20, mixed with 0.8% of gaseous AlCl$_3$, at a temperature of 500° C. A temperature of 780° C. was established under these conditions. The gas mixture entered the second reaction chamber at 22, into which 25 Nm.$^3$/hour of air were blown via 23 at a temperature of 1000° C. The reaction temperature in 24 was 1100° C. Inert ceramic friction bodies, which were introduced through 19 and through a corresponding inlet in 24 (not shown), because of their circular movement along the conical chamber walls, prevented the deposition of TiO$_2$. In the cyclone separators and dust filters connected to the apparatus, 13.6 kg. of rutile, which had excellent pigment qualities, were recovered hourly.

EXAMPLE 6

22.5 kg. of gaseous TiCl$_4$, mixed with 0.16 kg. of gaseous AlCl$_3$ were introduced hourly at a temperature of 250° C. into the apparatus according to FIG. 8. Simultaneously 15.2 Nm.$^3$/h. of air at a temperature of 750° C. were blown in at 34. Small amounts of corundum sand (grain size 0.3 mm.) were blown at intervals through the feed conduit 38 into the discharge space 35. The burner was operated with a voltage of 2 kv. and 3.1 A. This led to the establishment of a reaction temperature of 1105° in the secondary reaction tube 37.

In the apparatus connected to the reactor, which corresponds to that described in Example 1 there were obtained hourly 9.2 kg. of loose TiO$_2$ in rutile form, the particle size of which was between 0.2 and 0.3 micron. It had an excellent brightness, i.e. whiteness, a very good covering power and good dispersibility. The effluent gas contained 30.2% of Cl$_2$, 2.7% of O$_2$, 67% of N$_2$ and traces of HCl.

EXAMPLE 7

38 kg. of gaseous TiCl$_4$ and 270 g. of gaseous AlCl$_3$ at 400° C. were introduced hourly into the apparatus according to FIG. 8. At 34, 6.7 Nm.$^3$/h. of O$_2$ were blown in at room temperature. An arc with an output of 7.2 kw. was struck between the electrodes 33 and 36. A temperature of 1060° C. was established in the communicating secondary reaction tube. Corundum sand with a grain size of 0.3 mm. was introduced from time to time through 38 into the discharge space 35. 15.7 kg. of TiO$_2$ of highly uniform particle size were obtained hourly in the cyclone separators and dust filters connected to the apparatus. The pigment had an excellent clearing and covering, i.e. hiding, power and an outstandingly high degree of brightness. It had an above-average dispersibility in organic liquids. The effluent gas contained 79.5% of Cl$_2$, 20% of O$_2$ and traces of TiCl$_4$.

What is claimed is:

1. In the process for the production of inorganic pigments selected from the group consisting of titanium dioxide, silicon dioxide, aluminum trioxide, ferric oxide, mixtures of titanium dioxide and silicon dioxide, and mixtures of titanium dioxide and aluminum trioxide, by oxidation of the corresponding oxidizable inorganic halogen compounds as one reaction component with oxygen-containing gas as the other reaction component at reaction temperatures of between about 800–2000° C., the improvement for producing instantaneously uniform particles of uniform quality which consists essentially of heating said oxygen-containing gas, preheated to a preheat temperature between about 250–800° C. yet which preheat temperature is correspondingly below such reaction temperature of between about 800–2000° C., by electrical energy under a high voltage of between 2–10 kv. to a reaction temperature between about 800–2000° C. and above the corresponding preheat temperature, contacting directly and reacting said oxygen-containing gas which is heated to said temperature between about 800–2000° C. and said corresponding oxidizable inorganic halogen compound which is preheated to said temperature between about 250–800° C., under high turbulence whirling motion mixing contact with each other at a flow velocity of between about 5–50 m./sec. in a reaction zone circumferentially limited by an outer confining surface to decompose thermally the hot gaseous reaction components under the resultant highly turbulent flow conditions within said reaction zone and thereby to cause such oxidation and such production instantaneously of such uniform particles of uniform quality, while maintaining inert solid particle material in said zone under resultant high velocity substantially circular motion in scouring contact with the confining surface of said zone to prevent deposition of solid oxidation reaction product thereon, and separating such solid oxidation reaction product from the resultant mixture of solid oxidation reaction product and gaseous reaction product.

2. Improvement according to claim 1 wherein titanium tetrachloride and oxygen-containing gas are said components.

3. Improvement according to claim 1 wherein said oxygen-containing gas is selected from the group consisting of air and oxygen-enriched air.

References Cited

UNITED STATES PATENTS

| | | | |
|---|---|---|---|
| 2,488,440 | 11/1949 | Schaumann | 23—202 |
| 2,502,347 | 3/1950 | Schaumann | 23—202 |
| 2,721,626 | 10/1955 | Rick | 23—202 |
| 2,799,640 | 7/1957 | Revere et al. | 204—164 |
| 3,004,137 | 10/1961 | Karlovitz | 204—164 |
| 3,090,745 | 2/1963 | Berghaus | 204—164 |
| 3,105,742 | 10/1963 | Allen et al. | 23—202 |
| 3,147,077 | 9/1964 | Callow et al. | 23—202 |
| 3,148,027 | 9/1964 | Richmond | 23—202 |
| 3,275,411 | 9/1966 | Freeman et al. | 23—202 |
| 2,935,840 | 5/1960 | Schoppe. | |
| 3,051,639 | 8/1962 | Anderson | 204—164 X |
| 3,350,171 | 10/1967 | Callow et al. | 23—140 X |

HERBERT T. CARTER, Primary Examiner

U.S. Cl. X.R.

23—142, 182, 200; 106—288, 300; 204—164